United States Patent
Kolovich et al.

(10) Patent No.: US 6,508,969 B1
(45) Date of Patent: Jan. 21, 2003

(54) INJECTION-MOLDED END STOP FOR A SLIDER-OPERATED FASTENER

(75) Inventors: Nathan A. Kolovich, Rochester, NY (US); Russell J. Talbo, Lyons, NY (US); Joseph W. Eye, Orchard Park, NY (US); William F. Klepser, Jr., Snyder, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/636,244

(22) Filed: Aug. 10, 2000

(51) Int. Cl.[7] .................. B29C 45/14; B29C 70/76; B29C 70/78
(52) U.S. Cl. .................. 264/252; 264/263; 264/273; 264/274; 264/275; 24/30.5 R
(58) Field of Search .................. 264/250, 251, 264/252, 263, 271.1, 274, 275, 267, 273, 259, 277; 425/814; 24/399, 400, 30.5 R, 427, 435, 436, 389; 383/63, 65

(56) References Cited

U.S. PATENT DOCUMENTS

| | | | |
|---|---|---|---|
| 2,920,354 A | | 1/1960 | Zumbrunnen |
| 3,196,196 A | | 7/1965 | Burbank |
| 3,381,592 A | | 5/1968 | Ravel |
| 3,473,589 A | | 10/1969 | Gotz |
| 3,532,571 A | | 10/1970 | Ausnit |
| 3,590,109 A | | 6/1971 | Doleman et al. |
| RE27,174 E | | 9/1971 | Ausnit |
| 3,608,439 A | | 9/1971 | Ausnit |
| 3,613,524 A | | 10/1971 | Behr et al. |
| 3,701,191 A | | 10/1972 | Laguerre |
| 3,701,192 A | | 10/1972 | Laguerre |
| 3,758,657 A | | 9/1973 | Menzin et al. |
| 3,785,111 A | | 1/1974 | Pike |
| 3,833,329 A | | 9/1974 | Ulmachneider et al. |
| 3,839,128 A | | 10/1974 | Arai |
| 3,918,864 A | | 11/1975 | Braun |
| 3,948,705 A | | 4/1976 | Ausnit |
| 4,094,729 A | | 6/1978 | Boccia |
| 4,137,034 A | | 1/1979 | Moertel |
| 4,160,636 A | | 7/1979 | Magherini |
| 4,163,768 A | * | 8/1979 | Stephens .................. 264/163 |
| 4,186,161 A | | 1/1980 | Ulmschneider et al. |
| 4,196,030 A | | 4/1980 | Ausnit |
| 4,235,584 A | * | 11/1980 | Yunoki .................. 264/252 |
| 4,240,241 A | | 12/1980 | Sanborn, Jr. |
| 4,246,288 A | | 1/1981 | Sanborn, Jr. |

(List continued on next page.)

FOREIGN PATENT DOCUMENTS

| | | |
|---|---|---|
| EP | 0 939 034 | 9/1999 |
| EP | 0 978 450 | 2/2000 |
| EP | 1 026 077 A2 | 8/2000 |
| GB | 2 085 519 | 4/1982 |
| WO | 99/24325 | 5/1999 |

*Primary Examiner*—Angela Ortiz
(74) *Attorney, Agent, or Firm*—Jenkens & Gilchrist

(57) ABSTRACT

A fastener arrangement includes a fastener, a slider, and an injection-molded end stop. The fastener includes first and second tracks. The first track includes a first profile, and the second track includes a second profile for interlocking with the first profile. The fastener extends between first and second ends. The slider is slidably mounted to the fastener for movement between the first and second ends. The injection-molded end stop is located at least one of the first and second ends. The end stop terminates the movement of the slider at the one of the first and second ends. The end stop includes interior plastic material disposed in an interior of the fastener between the first and second profiles. The one of the first and second ends includes a cut edge at an angle relative to an axis of the fastener extending between the first and second ends. The end stop may include exterior plastic material along an exterior of the fastener outside the first and second profiles and covering the cut edge. A method of forming the end stop is also disclosed.

20 Claims, 5 Drawing Sheets

U.S. PATENT DOCUMENTS

| | | |
|---|---|---|
| 4,251,912 A | 2/1981 | Yoshida |
| 4,269,588 A | 5/1981 | Nogai |
| 4,277,241 A | 7/1981 | Schulze |
| 4,341,575 A | 7/1982 | Herz |
| 4,355,494 A | 10/1982 | Tilman |
| 4,372,793 A | 2/1983 | Herz |
| 4,415,386 A | 11/1983 | Ferrell et al. |
| 4,424,015 A | 1/1984 | Black et al. |
| 4,430,070 A | 2/1984 | Ausnit |
| 4,437,293 A | 3/1984 | Sanborn, Jr. |
| 4,517,788 A | 5/1985 | Scheffers |
| 4,528,224 A | 7/1985 | Ausnit |
| 4,563,319 A | 1/1986 | Ausnit et al. |
| 4,581,006 A | 4/1986 | Hugues et al. |
| 4,582,549 A | 4/1986 | Ferrell |
| 4,601,694 A | 7/1986 | Ausnit |
| 4,613,475 A | 9/1986 | Hettinga |
| 4,617,683 A | 10/1986 | Christoff |
| 4,651,504 A | 3/1987 | Bentsen |
| 4,655,862 A | 4/1987 | Christoff et al. |
| 4,663,915 A | 5/1987 | Van Erden et al. |
| 4,666,536 A | 5/1987 | Van Erden et al. |
| 4,673,383 A | 6/1987 | Bentsen |
| 4,691,372 A | 9/1987 | Van Erden |
| 4,703,518 A | 10/1987 | Ausnit |
| 4,709,398 A | 11/1987 | Ausnit |
| 4,709,533 A | 12/1987 | Ausnit |
| 4,710,157 A | 12/1987 | Posey |
| 4,782,951 A | 11/1988 | Griesbach et al. |
| 4,787,880 A | 11/1988 | Ausnit |
| 4,790,126 A | 12/1988 | Boeckmann |
| 4,807,300 A | 2/1989 | Ausnit et al. |
| 4,812,074 A | 3/1989 | Ausnit et al. |
| 4,828,778 A | 5/1989 | Gelsomini et al. |
| 4,840,012 A | 6/1989 | Boeckmann |
| 4,840,611 A | 6/1989 | Van Erden et al. |
| 4,842,799 A | 6/1989 | Kusayama |
| 4,844,759 A | 7/1989 | Boeckmann |
| 4,850,178 A | 7/1989 | Ausnit |
| 4,876,842 A | 10/1989 | Ausnit |
| 4,878,987 A | 11/1989 | Ven Erden |
| 4,892,414 A | 1/1990 | Ausnit |
| 4,892,512 A | 1/1990 | Branson |
| 4,894,975 A | 1/1990 | Ausnit |
| 4,909,017 A | 3/1990 | McMahon et al. |
| 4,924,655 A | 5/1990 | Posey |
| 4,925,318 A | 5/1990 | Sorensen |
| 4,929,225 A | 5/1990 | Ausnit et al. |
| 4,941,307 A | 7/1990 | Wojcik |
| 4,969,309 A | 11/1990 | Schwarz et al. |
| 4,974,395 A | 12/1990 | McMahon |
| 4,993,212 A | 2/1991 | Veoukas |
| 5,005,707 A | 4/1991 | Hustad et al. |
| 5,014,498 A | 5/1991 | McMahon |
| 5,027,584 A | 7/1991 | McMahon et al. |
| 5,036,643 A | 8/1991 | Bodolay |
| 5,042,224 A | 8/1991 | McMahon |
| 5,046,300 A | 9/1991 | Custer et al. |
| 5,057,259 A | 10/1991 | Parmelee |
| 5,063,639 A | 11/1991 | Boeckmann et al. |
| 5,067,208 A | 11/1991 | Herrington, Jr. et al. ..... 24/400 |
| 5,072,571 A | 12/1991 | Boeckmann |
| 5,085,031 A | 2/1992 | McDonald |
| 5,092,831 A | 3/1992 | James et al. |
| 5,096,516 A | 3/1992 | McDonald et al. |
| 5,105,603 A | 4/1992 | Natterer |
| 5,107,658 A | 4/1992 | Hustad et al. |
| 5,111,643 A | 5/1992 | Hobock |
| 5,116,301 A | 5/1992 | Robinson et al. |
| 5,127,208 A | 7/1992 | Custer et al. |
| 5,147,272 A | 9/1992 | Richison et al. |
| 5,161,286 A | 11/1992 | Herrington, Jr. et al. ..... 24/387 |
| 5,179,816 A | 1/1993 | Wojnicki |
| 5,188,461 A | 2/1993 | Sorensen |
| 5,211,482 A | 5/1993 | Tilman |
| 5,247,781 A | 9/1993 | Runge |
| 5,254,073 A | 10/1993 | Richison et al. |
| 5,259,904 A | 11/1993 | Ausnit |
| 5,273,511 A | 12/1993 | Boeckmann |
| 5,322,579 A | 6/1994 | Van Erden |
| 5,334,127 A | 8/1994 | Bruno et al. |
| 5,383,989 A | 1/1995 | McMahon |
| 5,400,565 A | 3/1995 | Terminella et al. |
| 5,400,568 A | 3/1995 | Kanemitsu et al. |
| 5,405,478 A | 4/1995 | Richardson et al. ..... 156/308.4 |
| 5,405,629 A | 4/1995 | Marnocha et al. |
| 5,412,924 A | 5/1995 | Ausnit |
| 5,415,904 A | 5/1995 | Takubo et al. |
| 5,425,216 A | 6/1995 | Ausnit |
| 5,425,825 A | 6/1995 | Rasko et al. |
| 5,435,864 A | 7/1995 | Machacek et al. |
| 5,448,807 A | 9/1995 | Herrington, Jr. ............. 24/399 |
| 5,470,156 A | 11/1995 | May |
| 5,482,375 A | 1/1996 | Richardson et al. .......... 383/64 |
| 5,489,252 A | 2/1996 | May |
| 5,492,411 A | 2/1996 | May |
| 5,505,037 A | 4/1996 | Terminella et al. |
| 5,509,735 A | 4/1996 | May |
| 5,511,884 A | 4/1996 | Bruno et al. |
| 5,519,982 A | 5/1996 | Herber et al. |
| 5,525,363 A | 6/1996 | Herber et al. |
| 5,536,460 A * | 7/1996 | Kuse ......................... 264/161 |
| 5,542,902 A | 8/1996 | Richison et al. |
| 5,551,127 A | 9/1996 | May |
| 5,551,208 A | 9/1996 | Van Erden |
| 5,557,907 A | 9/1996 | Malin et al. |
| 5,558,613 A | 9/1996 | Tilman et al. |
| 5,561,966 A | 10/1996 | English |
| 5,564,259 A | 10/1996 | Stolmeier |
| 5,573,614 A | 11/1996 | Tilman et al. |
| 5,592,802 A | 1/1997 | Malin et al. |
| 5,613,934 A | 3/1997 | May |
| 5,628,566 A | 5/1997 | Schreiter |
| 5,643,620 A | 7/1997 | Brun, Jr. |
| 5,647,671 A | 7/1997 | May |
| 5,664,299 A | 9/1997 | Porchia et al. ................ 24/400 |
| 5,669,715 A | 9/1997 | Dobreski et al. |
| 5,682,730 A | 11/1997 | Dobreski |
| 5,702,797 A | 12/1997 | Sakakibara et al. |
| 5,725,312 A | 3/1998 | May |
| 5,782,733 A | 7/1998 | Yeager |
| 5,788,378 A | 8/1998 | Thomas |
| 5,792,408 A | 8/1998 | Akeno et al. |
| 5,823,933 A | 10/1998 | Yeager |
| 5,833,791 A | 11/1998 | Bryniarski et al. |
| 5,836,056 A | 11/1998 | Porchia et al. ................ 24/400 |
| 5,902,611 A | 5/1999 | Stegmaier |
| 5,906,438 A | 5/1999 | Laudenberg |
| 5,924,173 A | 7/1999 | Dobreski et al. ............. 24/400 |
| 5,935,504 A | 8/1999 | Bienick et al. |
| 5,938,997 A | 8/1999 | Sakakibara et al. |
| 5,948,337 A | 9/1999 | Sakakibara et al. |
| 5,956,815 A | 9/1999 | O'Connor et al. ....... 24/30.5 R |
| 5,956,924 A | 9/1999 | Thieman |
| 5,971,738 A | 10/1999 | Jens et al. |
| 6,042,754 A | 3/2000 | Yang et al. |
| 6,044,621 A | 4/2000 | Malin et al. |
| 6,138,436 A | 10/2000 | Malin et al. |
| 6,138,439 A | 10/2000 | McMahon et al. |

* cited by examiner

US 6,508,969 B1

INJECTION-MOLDED END STOP FOR A SLIDER-OPERATED FASTENER

REFERENCE TO RELATED APPLICATIONS

The present application is being filed concurrently with U.S. patent application Ser. No. 09/636,421 entitled "Slider-Operated Fastener With Spaced Notches and Associated Preseals," U.S. patent application Ser. No. 09/637,037 entitled "Method of Applying a Slider to a Fastener Carrying Plastic Web," U.S. patent application Ser. No. 09/635,451 entitled "Method and Apparatus for Guiding a Fastener in a Bag Making Machine," and U.S. patent application Ser. No. 09/637,038 entitled "Method and Apparatus for Making Reclosable Plastic Bags Using a Pre-Applied Slider-Operated Fastener," all of which are incorporated herein by reference in their entireties.

FIELD OF THE INVENTION

The present invention generally relates to reclosable plastic bags and, more particularly, to an injection-molded end stop for a slider-operated fastener.

BACKGROUND OF THE INVENTION

A fastener arrangement for reclosable plastic bags typically includes a fastener, a slider, and a pair of end stops. The fastener includes first and second tracks. The first track includes a first profile, and the second track includes a second profile for interlocking with the first profile. The slider is slidably mounted to the fastener for movement between opposite ends of the fastener. The end stops are located at the opposite ends of the fastener.

The end stops perform three functions: (1) preventing the slider from going past the ends of the fastener, (2) holding the profiles together to resist stresses applied to the profiles during normal use of the plastic bag, and (3) minimizing leakage from inside the plastic bag out through the fastener ends. In U.S. Pat. No. 5,067,208, each end stop is in the form of a fairly rigid strap/clip that wraps over the top of the fastener. One end of the strap is provided with a rivet-like member that penetrates through the fastener fins and into a cooperating opening at the other end of the strap. Other types of end stops are disclosed in U.S. Pat. Nos. 5,924,173, 5,833,791, 5,482,375, 5,448,807, 5,442,837, 5,405,478, 5,161,286, 5,131,121, and 5,088,971.

For example, U.S. Pat. No. 5,833,791 proposes an injection-molded end stop disposed along only an exterior of a fastener outside a pair of interlocked profiles. The narrow end stop is spaced from a cut edge at the end of the fastener and extends along the length of the fastener for only a very short distance. On the one hand, the manufacturing process of injecting softened plastic material about the fastener and molding the plastic material into the end stop is quick, efficient, and cost effective. On the other hand, because the end stop is so limited in size and is not firmly anchored, the end stop is weaker than some other types of end stops such as the above-noted riveted strap. As a result, the end stop might not be able to withstand some of the abuses and stresses that can be inflicted by the slider during normal use of the plastic bag.

A need therefore exists for an injection-molded end stop that overcomes shortcomings associated with prior injection-molded end stops.

SUMMARY OF THE INVENTION

A fastener arrangement includes a fastener, a slider, and an injection-molded end stop. The fastener includes first and second tracks. The first track includes a first profile, and the second track includes a second profile for interlocking with the first profile. The fastener extends between first and second ends. The slider is slidably mounted to the fastener for movement between the first and second ends. The injection-molded end stop is located at least one of the first and second ends. The end stop terminates the movement of the slider at the one of the first and second ends. The end stop includes interior plastic material disposed in an interior of the fastener between the first and second profiles. The one of the first and second ends includes a cut edge at an angle relative to an axis of the fastener extending between the first and second ends. The end stop may include exterior plastic material along an exterior of the fastener outside the first and second profiles and covering the cut edge. A method of forming the end stop is also disclosed.

BRIEF DESCRIPTION OF THE DRAWINGS

Other objects and advantages of the invention will become apparent upon reading the following detailed description and upon reference to the drawings in which.

Figure 1:
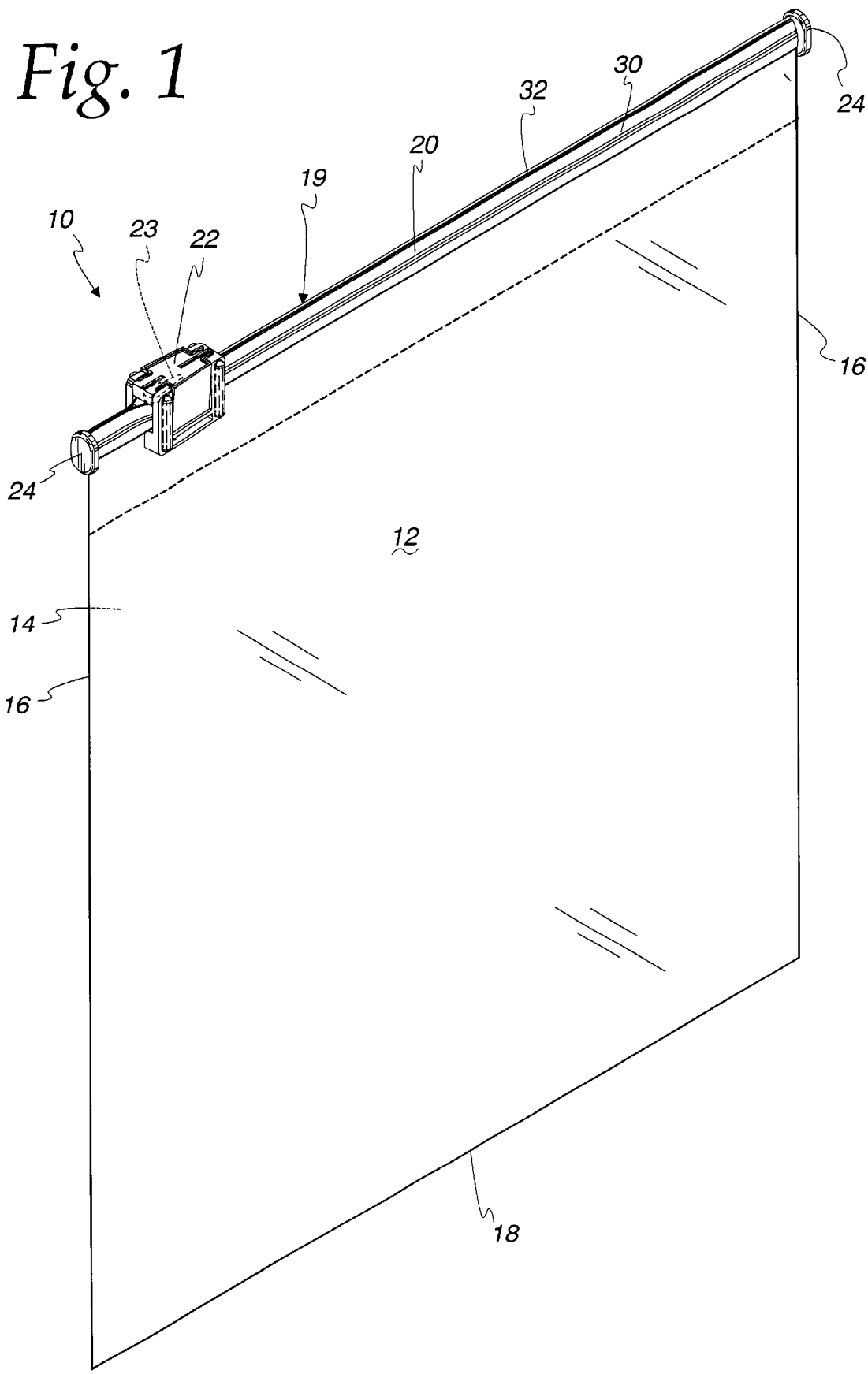
FIG. 1 is an isometric view of a reclosable plastic bag embodying the present invention, the bag including a fastener arrangement along its mouth, the fastener arrangement including a slider-carrying fastener and a pair of end stops at opposite ends of the fastener.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Figure 2:
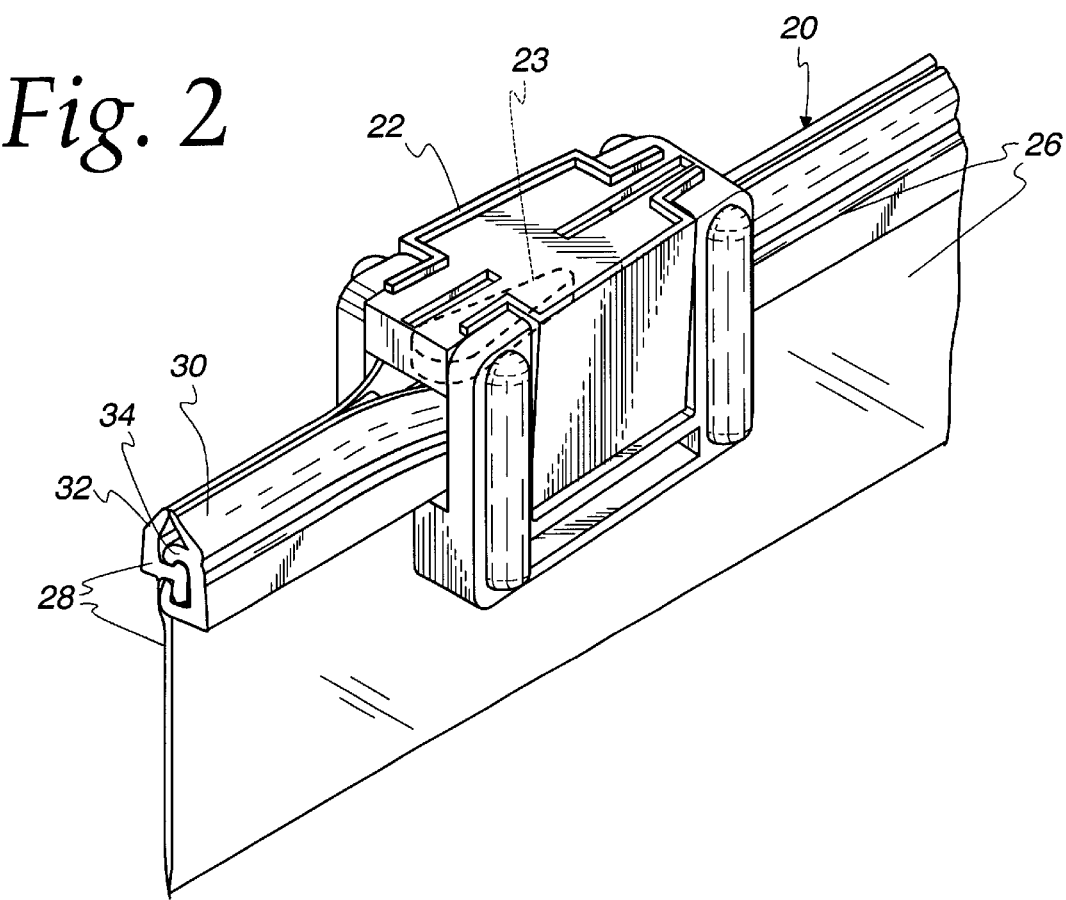
FIG. 2 is an enlarged isometric view of one end of the fastener prior to forming an end stop.

Turning to the drawings, FIG. 1 depicts a reclosable plastic bag 10 embodying the present invention. The bag 10 includes a pair of opposing panels 12 and 14 joined along a pair of sides 16 and a bottom 18 bridging the pair of sides. The bag 10 also includes a fastener arrangement 19 along its mouth opposite the bottom 18. The fastener arrangement 19 includes a fastener 20, a slider 22, and a pair of injection molded end stops 24. Referring to FIG. 2, the fastener 20 includes first and second opposing tracks 26 and 28. The first track 26 includes a first profile 30, and the second track 28 includes a second profile 32 for interlocking with the first profile. The first profile 30 preferably forms a groove, and the second profile 32 preferably forms a rib for insertion into the groove of the first profile. Referring back to FIG. 1, the injection-molded end stops 24 are located at opposite ends of the fastener 20. The slider 22 is slidably mounted to the fastener 20 for movement between these opposite ends. The end stops 24 terminate the movement of the slider 22 at the respective opposite ends of the fastener 20. In one embodiment, the slider 22 disengages the profiles 30 and 32 as the slider 22 is moved in an "opening" direction toward one of the end stops 24, and engages the profiles 30 and 32 as the slider 22 is moved in a "closing" direction toward the other of the end stops 24.

FIG. 2 is an enlarged view of one end of the fastener 20 prior to forming the end stop 24. The end of the fastener 20 includes a cut edge 34 at an angle relative to an axis of the fastener 20 extending between the fastener's opposite ends. This angle is preferably 90 degrees such that the cut edge 34 is perpendicular to the axis of the fastener 20.

FIGS. 3 through 6 depict an end stop forming station for applying each end stop 24 to the fastener 20. Each plastic end stop 24 is made from a predetermined amount of flowable plastic material that migrates from or is injected from a supply tube 36 through one of a pair of chilled, reciprocating molds 38 and 40. In the illustrated embodiment, the supply tube 36 delivers the plastic material to the inner surface or cavity of the mold 38.

The end stop 24 is composed of one or more flowable materials capable of being solidified and anchored to the fastener 20. The flowable materials may be thermoplastic or thermoset materials. Typical base materials for making the end stop may include polyolefins such as polymethylpentene, cyclic olefin copolymer and blends of these polymers with PE or PP; thermoplastics such as ethylene-vinyl acetate, polyethylene, polyvinyl acetates, polypropylene, polyesters (PET, PPT, PBT, PEN, etc.), polyamides (nylon6, nylon 6,6, etc.), polycarbonate, polyarylates, polysulfones (PSU, PESU, etc.), polyimides (PEI, PAI, etc.), liquid crystal polymers, acrylics (PMMA, etc.), styrenics (PS, HIPS), polyphenylene oxide/sulfide (PPO/PPS), polyacetals, polyvinyl butyrate, cellulosics (cellulose acetate, triacetate, etc.), polyketones (peek, ETC.), polyurethanes, fluorohydrocarbones (PTFE, ECTFE, PVDF, etc.) and others; and thermosets such as phenolic resins, amino resins, unsaturated polyester resins, epoxy resins, urethanes, silicone resins, allyl resins, etc. Additional modifying components may include some of the following or combinations of the following: 1) tackifiers to promote wetting, flexibility, and adhesion, such as rosin, tacky polymers, terpenes, hydrocarbons, and chlorinated hydrocarbons, 2) plasticizer to promote flexibility and wetting, such as phthalates, glycolates, polybutenes, and mineral oil, 3) wax to dilute, nonblock, rigidify and promote wetting and vary setting speed, such as paraffin, microcrystalline, vegetable and synthetic wax, 4) extender to lower cost and control flow in melt or color, such as talc, barytes, or clay, 5) antioxidant to maintain and stabilize viscosity, color, and odor, such as hindered phenols, and 6) colorants.

The inner surface of each mold (e.g., mold 38 in FIG. 4) defines a funnel shaped receiving channel 42 receiving the flowable plastic material from the supply tube and a guiding channel 44 guiding the received plastic material to the end of the fastener 20. The guiding channel 44 includes a deep section 44a and a shallow section 44b. The deep section 44a is directly coupled to a lower end of the receiving channel 42 and holds the fastener's cut edge 34 and immediately adjacent section when the molds 38 and 40 are closed around the end of the fastener 20. The deep section 44a is sufficiently deep that a small gap exists between the outer surface of the associated fastener profile and the wall of the deep section 44a when the molds 38 and 40 are closed around the end of the fastener 20. The shallow section 44b extends from the deep section 44a and holds a fastener portion proximate the cut edge 34 when the molds 38 and 40 are closed around the end of the fastener 20 (see FIG. 5). The shallow section 44b is shaped to fit snugly around the outer surface of the associated fastener profile when the molds 38 and 40 are closed around the end of the fastener 20.

Figure 3:
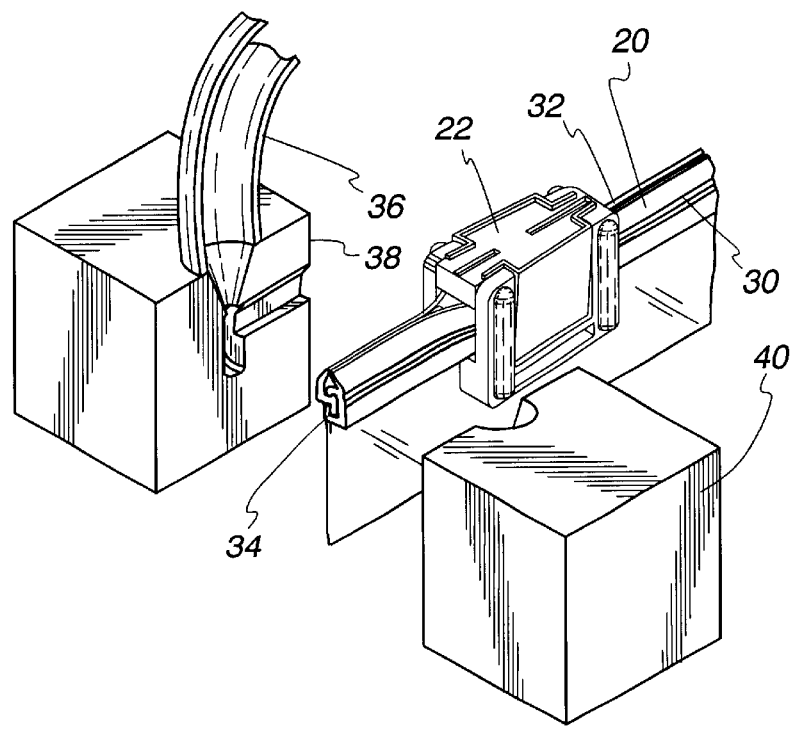
FIG. 3 is an enlarged isometric view of the end of the fastener showing a pair of reciprocating molds in an open position.
Figure 4:
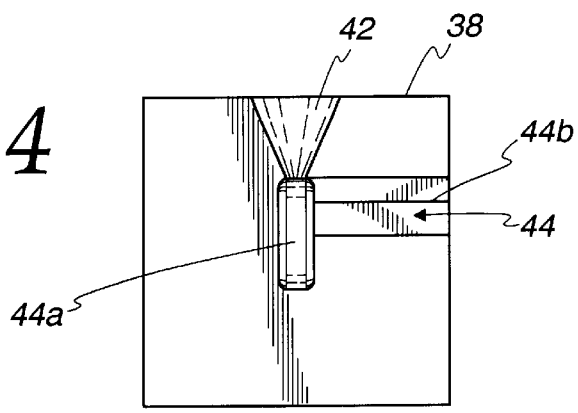
FIG. 4 is a side view of one of the molds.
Figure 5:
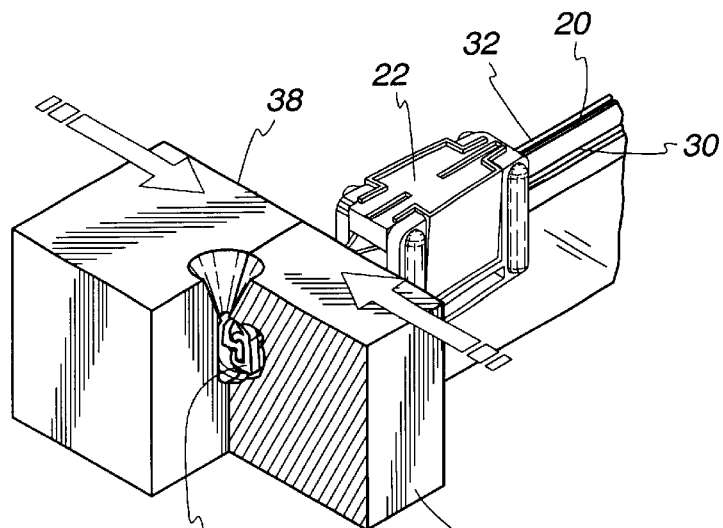
FIG. 5 is an enlarged isometric view of the end of the fastener showing the pair of molds in a closed position while forming the end stop.

At the end stop forming station, the reciprocating molds 38 and 40 are initially in an open position depicted in FIG. 3. In response to conveying the end of the fastener 20 between the separated molds 38 and 40, the molds 38 and 40 are moved to a closed position depicted in FIG. 5. While the molds 38 and 40 are closed around the end of the fastener 20, a predetermined amount of flowable plastic material is forced around and between the fastener profiles by a conventional back pressure device (not shown) coupled to the supply tube.

Because of the small gap between the wall of the deep section 44a of the guiding channel 44 and the associated fastener profile, the deep section 44a allows a portion of the injected plastic material to flow along an exterior of the fastener 20 outside the profiles 30 and 32. The exterior plastic material essentially forms a thin skin covering the outer surface of the fastener profiles 30 and 32 at the end of the fastener 20. Because no gap exists between the wall of the shallow section 44b of the guiding channel 44 and the associated fastener profile, the exterior plastic material stops migrating along the exterior of the fastener 20 at the juncture between the deep and shallow sections 44a, 44b of the guiding channel 44. In addition to flowing along an exterior of the fastener 20, the injected plastic material covers the cover edge 34. As the plastic material covers the cut edge 34, a portion of the injected plastic material enters an interior of the fastener 20 via the cut edge 34 and flows inwardly between the profiles 30 and 32, starting from the cut edge 34. The chilled molds 38 and 40 shape and solidify the plastic material.

Figure 6:
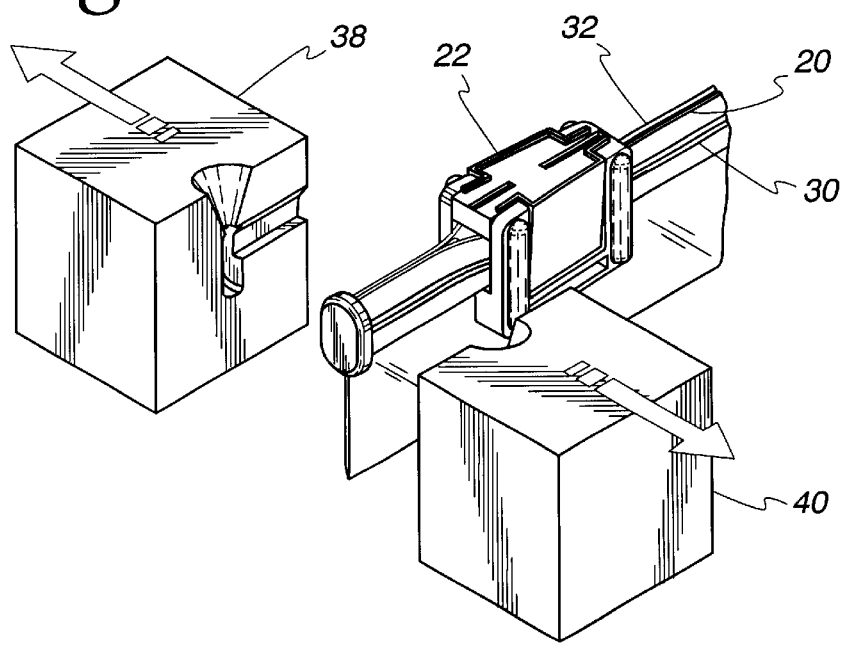
FIG. 6 is an enlarged isometric view of the end of the fastener showing the pair of molds returned to the open position after forming the end stop.
Figure 7:
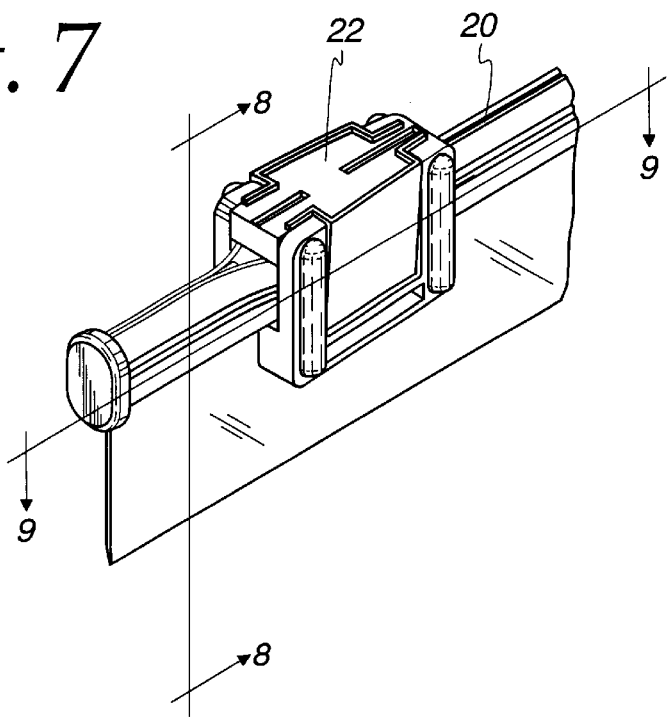
FIG. 7 is an enlarged isometric view of the end of the fastener after forming the end stop.
Figure 8:
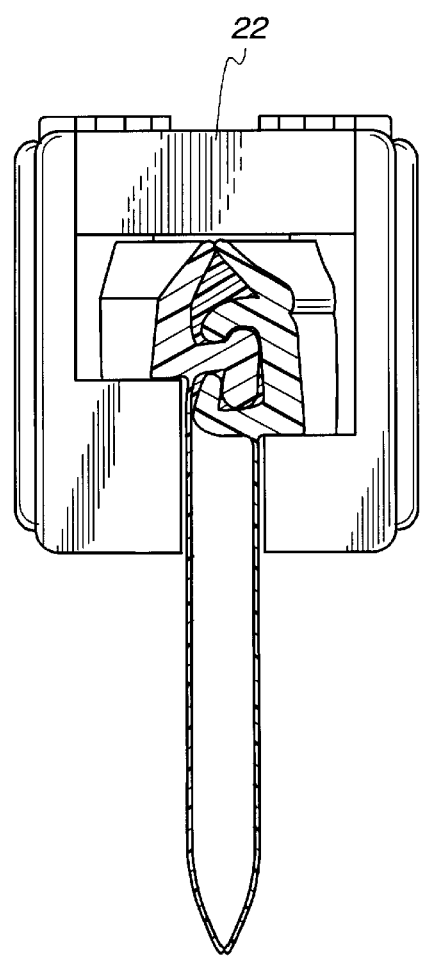
FIG. 8 is a section view taken generally along line 8—8 in FIG. 7.
Figure 9:
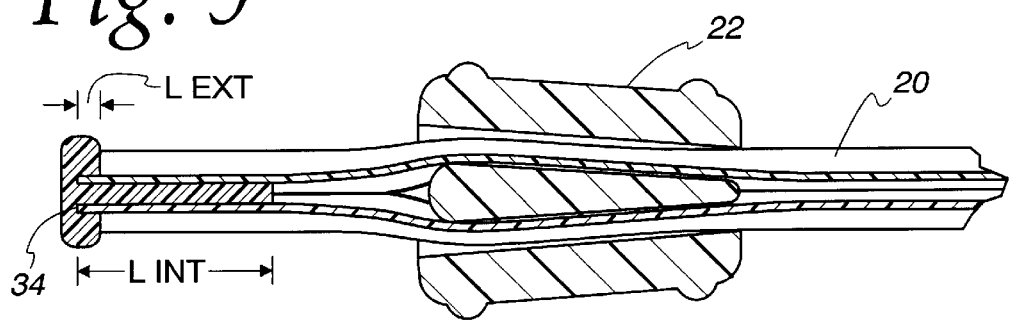
FIG. 9 is a section view taken generally along line 9—9 in FIG. 7.

After the injected plastic material is molded around and between the profiles 30 and 32 and solidified, the reciprocating molds 38 and 40 are returned to the open position depicted in FIG. 6. The resulting fastener arrangement 19, including the injection-molded end stop 24, is shown in FIG. 7. As noted above, the plastic material includes both an exterior portion and an interior portion. The exterior plastic material covers the orthogonal cut edge 34 at the extreme end of the fastener 20 and, starting from this cut edge 34, the exterior plastic material extends along the exterior of the fastener 20 for a length $L_{ext}$ equal to or greater than zero and, more preferably, at least 0.030 inch, and, most preferably, about 0.050 to 0.062 inch (see FIG. 9). In addition, the exterior plastic material has a thickness equal to or greater than zero and, most preferably, about 0.010 inch. In other words, the thickness represents the distance by which the exterior plastic material extends outwardly from the outer surface of the fastener 20. The interior plastic material extends along the interior of the fastener 20 for a length $L_{int}$ of at least about 0.015 inch, starting from the cut edge 34 (see FIG. 9).

Referring back to FIGS. 1 and 2, the slider 22 includes a separator finger 23 extending downward from the slider's top wall and between the profiles 30 and 32. As indicated by its name, the separator finger 23 helps to separate or disengage the profiles 30 and 32 as the slider 22 is moved along the fastener 20 in the "opening" direction. As the slider 22 is moved along the fastener 20 in either the "opening" or "closing" direction and approaches an end of the fastener 20, the separator finger 23 contacts the interior plastic material of the end stop 24 to terminate the movement of the slider 22. To aid in terminating the movement of the slider 22, the end stop 24 and/or the slider 22 may be designed so that the leading end of the slider simultaneously contacts the exterior plastic material of the end stop 24. Further information concerning the slider 22 and the manner in which it operates the fastener 20 may be obtained from U.S. Pat. No. 5,007,143, which is incorporated herein by reference in its entirety.

Figure 10:
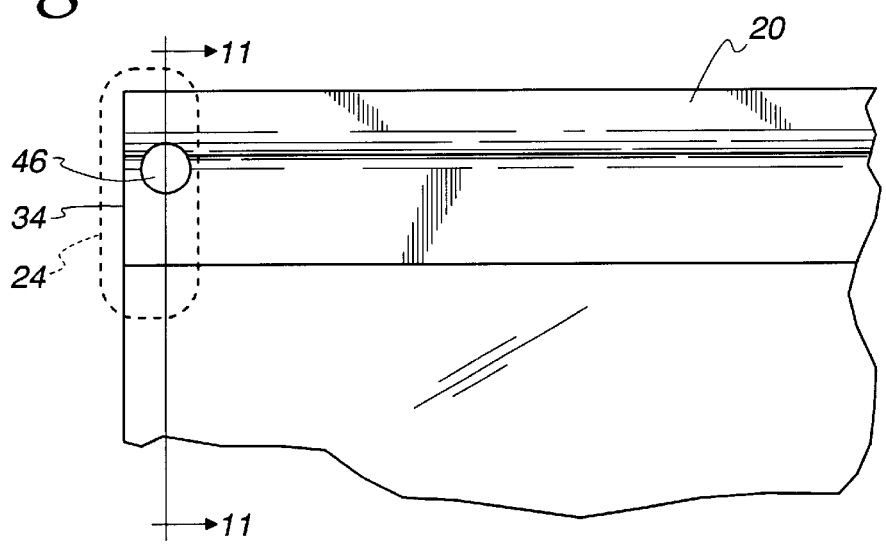
FIG. 10 is a side view of the end of the fastener prior to forming an end stop, in accordance with an alternative embodiment of the present invention.
Figure 11:
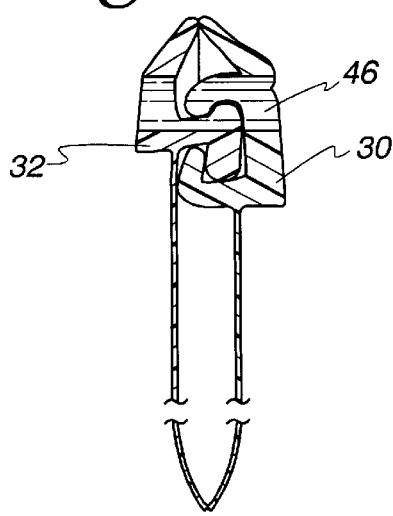
FIG. 11 is a section view taken generally along line 11—11 in FIG. 10.
Figure 12:
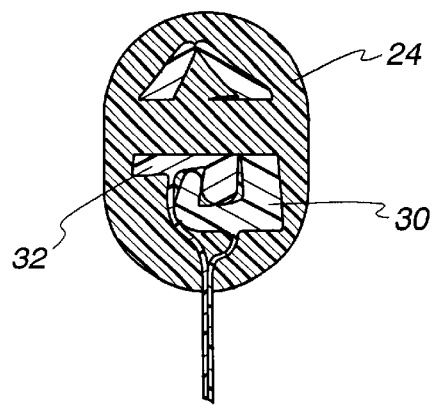
FIG. 12 is a section view similar to FIG. 11 after forming the end stop.

In the embodiment of FIGS. 1–9, the injection molding process causes some plastic material to flow into the interior of the fastener 20 between the profiles 30 and 32 via the cut edge 34. This interior plastic material increases the fastener end strength afforded by the end stop 24. To further increase the end strength, the fastener 20 may include an aperture 46 proximate each of its opposite ends as depicted in FIGS. 10 and 11. As shown in FIG. 12, the aperture 46 allows more plastic material to flow between the profiles 30 and 32 during the injection molding process. Specifically, the injection molding process causes plastic material to flow into the interior of the fastener 20 between the profiles 30 and 32 via both the cut edge 34 and the aperture 46. The aperture 46 extends from the exterior of the fastener 20 outside the profiles 30 and 32 to the interior of the fastener 20 between the profiles 30 and 32. The aperture preferably has a minimum diameter of about 0.030 inch. At smaller diameters, the aperture may be created with a puncturing needle; at larger diameters, the aperture may be created with a punch mechanism.

The end stop is preferably designed to provide a minimum slider retention force of about 3 to 4.5 pounds, which should retain the slider on the fastener during normal use of the bag. To achieve this slider retention force, various parameters may be varied relative to each other, such as (1) the length $L_{ext}$, thickness, and length $L_{int}$, of the end stop, (2) the diameter of the aperture, and (3) the composition of the end stop. Increases in one dimension may allow for decreases in another dimension. For example, it is possible to make a functional end stop by injecting the plastic material inside the fastener 20 only with no exterior plastic material.

While the present invention has been described with reference to one or more particular embodiments, those skilled in the art will recognize that many changes may be made thereto without departing from the spirit and scope of the present invention. For example, the molds can be modified to allow the simultaneous formation of a pair of injected-molded end stops on adjacent bags in a line of interconnected bags. In this case, one end stop is formed on a trailing end of a fastener segment of one bag and another end stop is formed on a leading end of a fastener segment of the next adjacent bag. To accomplish the simultaneous formation of a pair of end stops, each mold can be designed with two sets of identical channels symmetrical about a vertical plane where each set of channels is used to receive and guide flowable plastic material for forming a respective end stop. Each of these embodiments and obvious variations thereof is contemplated as falling within the spirit and scope of the claimed invention, which is set forth in the following claims.

What is claimed is:

1. A method of forming an end stop for a fastener arrangement, said fastener arrangement including a fastener and a slider, said fastener including first and second tracks, said first track including a first profile, said second track including a second profile for interlocking with said first profile, said fastener extending between first and second ends, said slider being slidably mounted to said fastener for movement between said first and second ends, said method comprising:

supplying a predetermined amount of flowable plastic material;

guiding said flowable plastic material to said first end such that a portion of said plastic material flows along an interior of said fastener between said first and second profiles for a length "L" adjacent to said first end without any portion of said plastic material flowing on an exterior of said fastener along said length "L"; and solidifying said flowable plastic material.

2. The method of claim 1, wherein said step of supplying said predetermined amount of flowable plastic material includes passing said flowable plastic material through a supply line.

3. The method of claim 1, wherein said step of guiding said flowable plastic material includes injecting said flowable plastic material between said first end and a mold structure adjacent to said first end.

4. The method of claim 3, wherein said step of injecting said flowable plastic material forces said portion of said plastic material to flow along said interior of said fastener between said first and second profiles.

5. The method of claim 3, wherein said mold structure includes a pair of reciprocating molds that close around said first end.

6. The method of claim 3, wherein said mold structure includes an inner surface forming a receiving channel receiving said flowable plastic material and a guiding channel guiding said received plastic material to said first end, said guiding channel being coupled to said receiving channel.

7. The method of claim 3, wherein said mold structure is chilled, and wherein said step of solidifying said flowable plastic material includes chilling said flowable plastic material with said chilled mold structure.

8. The method of claim 1, wherein said first end includes a cut edge at an angle relative to an axis of said fastener extending between said first and second ends, wherein said step of guiding said flowable plastic material is performed such that said second portion of said plastic material covers said cut edge.

9. The method of claim 1, wherein said step of guiding said flowable plastic material includes injecting said flowable plastic material into said interior of said fastener via an aperture proximate said first end.

10. A method of forming an end stop for a fastener arrangement, said fastener arrangement including a fastener and a slider, said fastener including first and second tracks, said first track including a first profile and a first downwardly extending portion below said first profile, said second track including a second profile for interlocking with said first profile and a second downwardly extending portion below said second profile, said first and second downwardly extending portions being attached at their terminal ends, said fastener extending between first and second ends, said slider being slidably mounted to said fastener for movement between said first and second ends, said method comprising:

moving said first and second tracks into a mold while said terminal ends of said first and second downwardly extending portions remain attached; and injecting and molding a predetermined amount of flowable plastic material proximate at least one of said first and second ends such that at least a portion of said plastic material flows along an interior of said fastener between said first and second profiles.

11. A method of forming an end stop for a fastener arrangement, said fastener arrangement including a fastener and a slider, said fastener including first and second tracks, said first track including a first profile, said second track including a second profile for interlocking with said first profile, said fastener extending between first and second ends, said slider being slidably mounted to said fastener for movement between said first and second ends, said first end including a cut edge at an angle relative to an axis of said fastener extending between said first and second ends, said method comprising:

injecting and molding a predetermined amount of flowable plastic material proximate said first end such that a first portion of said plastic material flows along an exterior of said fastener outside said first and second profiles at said cut edge and covers said cut edge while a second portion of said plastic material extends for a length "L" between said first and second profiles on an interior surface of said fastener, said exterior of said fastener along said length "L" being free of said flowable plastic material.

12. A method of forming an end stop for a fastener arrangement, said fastener arrangement including a fastener and a slider, said fastener including first and second tracks, said first track including a first profile, said second track including a second profile for interlocking with said first profile, said fastener extending between first and second ends, said slider being slidably mounted to said fastener for movement between said first and second ends, said method comprising:

providing a mold structure including a pair of reciprocating molds;

closing said molds about at least one of said first and second ends such that interior surfaces of said molds snugly fit against an exterior of said first and second profiles along a continuous length "L" measured from said first end;

injecting a predetermined amount of flowable plastic material into a receiving channel formed by said closed molds;

guiding said injected plastic material through a guiding channel formed by said closed molds such that at least a portion of said plastic material flows along an interior of said fastener between said first and second profiles and the flow of said plastic material onto said exterior of said first and second profiles along said continuous length "L" is inhibited due to said molds fitting snugly against said exterior of said first and second profiles, said guiding channel being coupled to said receiving channel; and opening said molds.

13. A method of forming an end stop for a fastener arrangement, said fastener arrangement including a fastener and a slider, said fastener including first and second tracks, said first track including a first profile and a first downwardly extending portion below said first profile, said second track including a second profile for interlocking with said first profile and a second downwardly extending portion below said second profile, said first and second downwardly extending portions being attached to each other at their terminal ends, said fastener extending between first and second ends, said slider being slidably mounted to said fastener for movement between said first and second ends, at least one of said first and second ends including a cut edge at an angle relative to an axis of said fastener extending between said first and second ends, said method comprising:

providing a mold structure including a pair of reciprocating molds;

closing said molds about said one of said first and second ends while said terminal ends of said first and second downwardly extending portions remain attached;

injecting a predetermined amount of flowable plastic material into a receiving channel formed by said closed molds;

guiding said injected plastic material through a guiding channel formed by said closed molds such that at least a portion of said plastic material flows along an exterior of said fastener outside said first and second profiles and covers said cut edge, said guiding channel being coupled to said receiving channel; and opening said molds.

14. The method of claim 3, wherein said mold structure has a guide channel that snugly fits around said fastener to inhibit flow of said plastic material to said exterior of said fastener.

15. The method of claim 1, wherein another portion of said plastic material flows around an exterior of said fastener at said first end.

16. The method of claim 1, wherein terminal ends of said track opposite said profiles are attached.

17. The method of claim 10, wherein said injecting and molding includes closing a mold around said fastener, said mold has a guide channel that snugly fits around said fastener to inhibit flow of said plastic material to said-exterior of said fastener along a length "L" adjacent to said at least one of said first and second ends.

18. The method of claim 11, wherein terminal ends of said tracks opposite said profiles, are attached to each other.

19. The method of claim 12, wherein terminal ends of said tracks -opposite said profiles are attached to each other.

20. The method of claim 13, wherein said mold has a guide channel that snugly fits around said fastener to inhibit flow of said plastic material to said exterior of said fastener along a length "L" adjacent to said at least one of said first and second ends.

* * * * *